Sept. 6, 1955   D. W. JOHNSTON   2,716,975
COMBUSTION TYPE AIR HEATER FOR DRYING PURPOSES
Filed Nov. 14, 1951   5 Sheets-Sheet 2

INVENTOR
DANAL W. JOHNSTON
BY Toulmin & Toulmin
ATTORNEYS

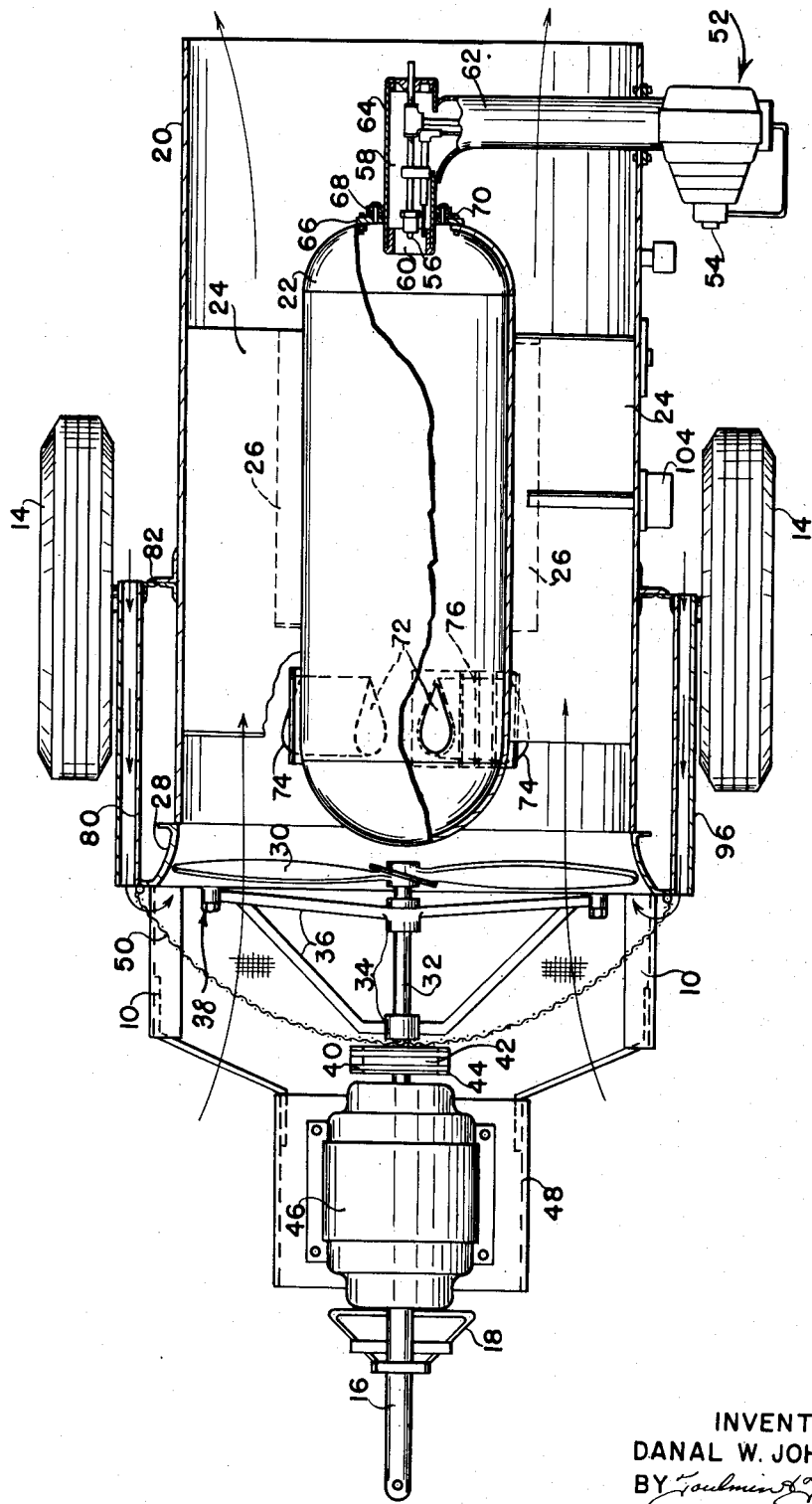

Sept. 6, 1955 D. W. JOHNSTON 2,716,975
COMBUSTION TYPE AIR HEATER FOR DRYING PURPOSES
Filed Nov. 14, 1951 5 Sheets-Sheet 4

INVENTOR
DANAL W. JOHNSTON
BY Toulmin & Toulmin
ATTORNEYS

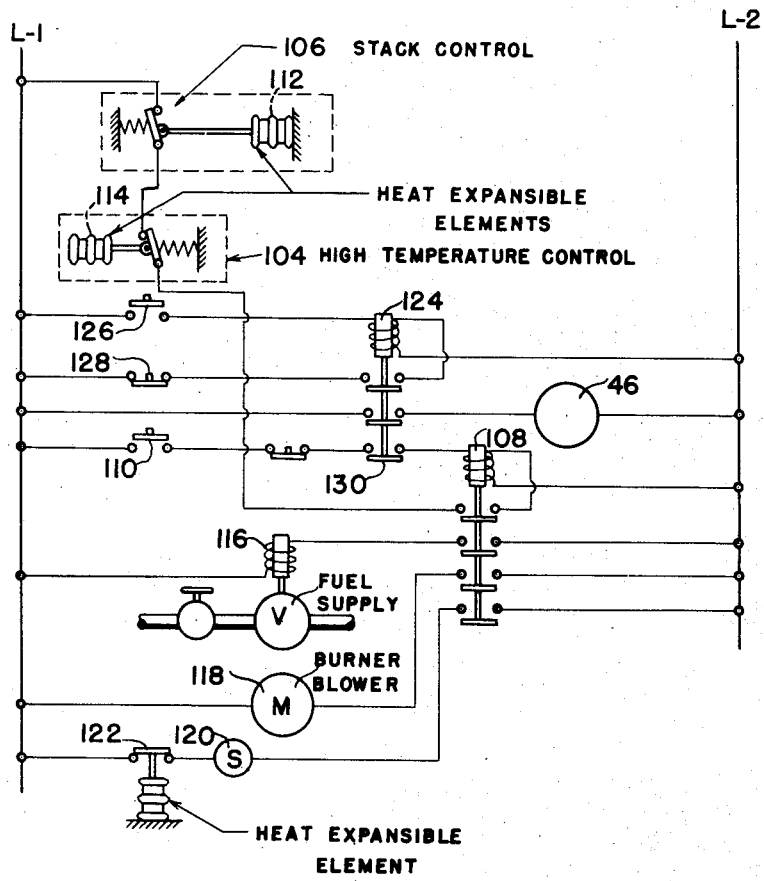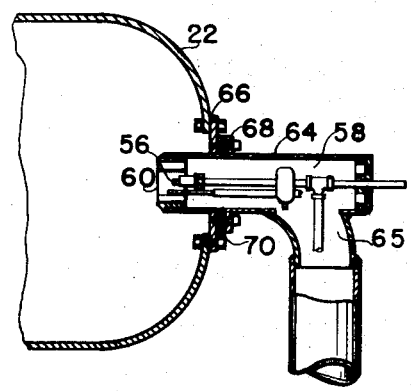

United States Patent Office 2,716,975
Patented Sept. 6, 1955

2,716,975

COMBUSTION TYPE AIR HEATER FOR DRYING PURPOSES

Danal W. Johnston, Piqua, Ohio, assignor to Hartzell Industries, Inc., Piqua, Ohio, a corporation of Ohio Application November 14, 1951, Serial No. 256,191

8 Claims. (Cl. 126—110)

This invention relates to a combustion type air heater, and particularly to such a heater in the form of a portable apparatus especially adapted for being utilized in the drying of farm crops and the like.

Many farm crops are advantageously dried to a predetermined degree before being marketed, processed, or stored. Particular examples of such crops are grain crops, such as corn, soy beans, rice, etc., and forage crops. The apparatus of this invention is adapted for being utilized in drying such crops quickly and efficiently. Other crops, such as tobacco, fruits, and vegetables, may also be dried by the use of the apparatus of this invention and the same advantages of speed of drying under controlled drying conditions would obtain.

The primary object of the present invention is to provide an improved type portable air heater which can be used for the purposes referred to above, as well as being adapted for industrial use or in any other circumstance where it is desired to provide for a volume of hot air to carry out a drying operation.

A particular object of the present invention is to provide for an air heater of the nature described in which a high degree of efficiency obtains at all times.

Another object is the provision of an air heater of the nature referred to in which there is efficient heat exchange between the source of heat and the air passing through the air heater, but without materially obstructing the passage of the said air, whereby large volumes of heated air are available.

Another object of the present invention is to provide an arrangement for an air heater of the nature described wherein the air being heated forms a blanket over substantially all of the heated parts of the heater, thereby greatly reducing the chance of an attendant being burned by touching the drier and also greatly reducing the chance of a fire being started by the drier.

Another object is the provision of a combination of a fan including an orifice ring and a heater for heating air blown by the blower wherein the orifice ring forms a portion of the heat exchange surface.

Still another object of this invention is the provision of a drying apparatus wherein the heat is generated by a burner and wherein the stream of air to be heated is completely isolated from the flame of the burner and the products of combustion thereof.

A particular object is the provision of a novel type burner unit for use with a drying apparatus of the nature described.

These and other objects and advantages will become more apparent upon reference to the following specification, taken in connection with the accompanying drawings, wherein:

Figure 3 is a plan section through the drier, indicated by line 3—3 on Figure 1;

Figure 7 is a detailed view showing the construction of a typical burner unit for use in connection with this invention; and Figure 8 is a wiring diagram showing one form which the electric control circuit, according to this invention, may take.

Figure 1:
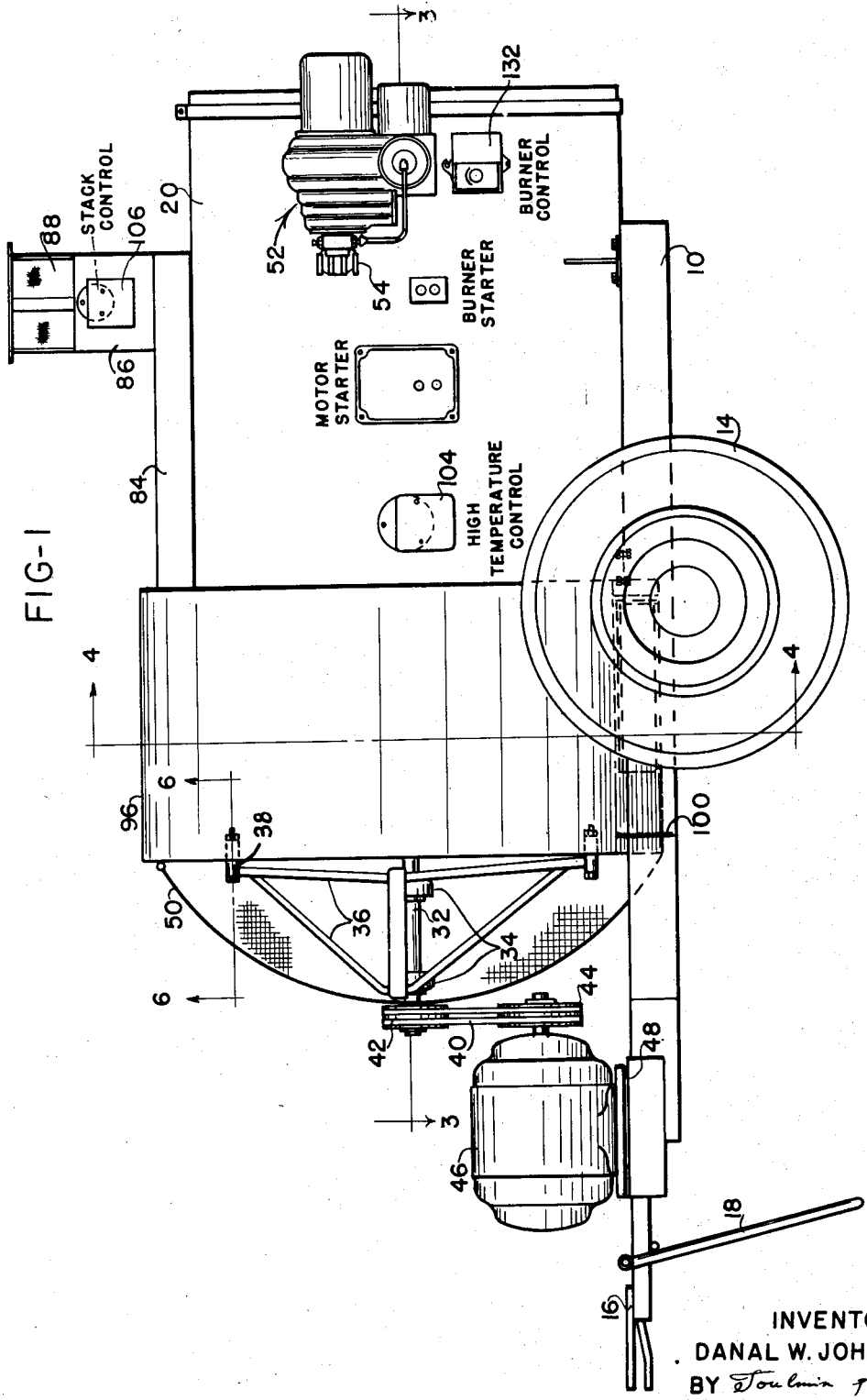
Figure 1 is a side elevational view of a portable drier according to this invention.

Referring to the drawings somewhat more in detail, the drying apparatus, or air heater, arrangement of this invention comprises a frame which may be made up of the channel-shaped side members 10 suitably interconnected to form a solid unit and mounted on an axle structure 12 having supporting wheels 14.

At one end the supporting frame for the drying apparatus mounts a clevis or yoke 16 by means of which the drier can be attached to a tractor for moving it about. This same end of the frame also preferably includes an adjustable pedestal member 18 for supporting the frame when it is disconnected from the tractor.

The drying apparatus proper includes a main cylindrical outer shell 20 supported on the frame of the unit and within which is centrally located a cylindrical cartridge 22 closed at both ends and within which the burner flame which provides the heat for the unit is confined.

Figure 2:
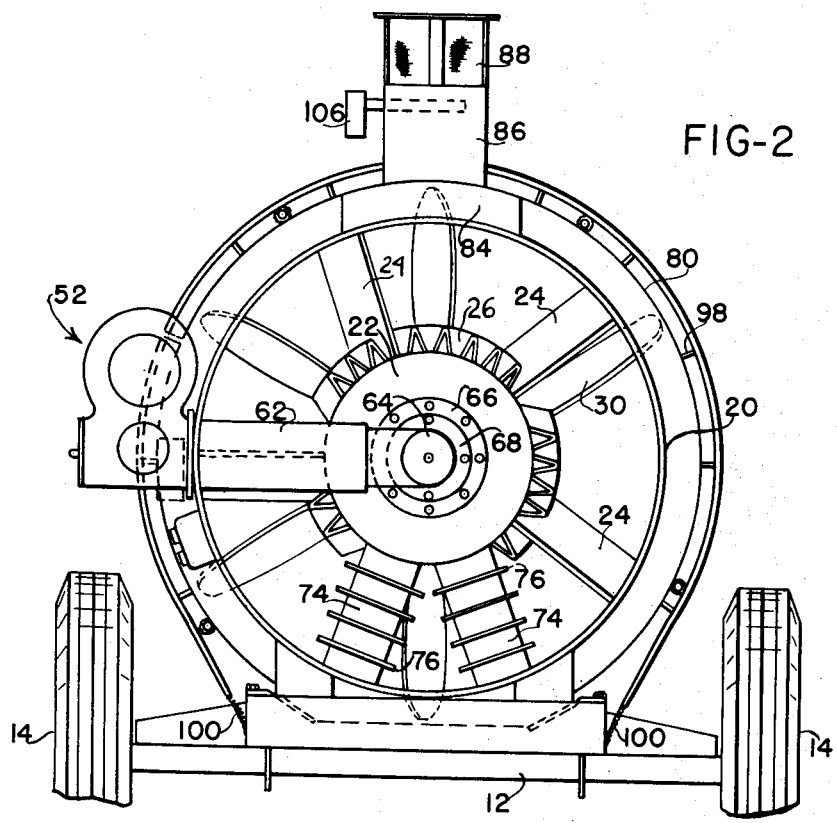
Figure 2 is an end view of the drier looking in from the right side of Figure 1.
Figure 4:
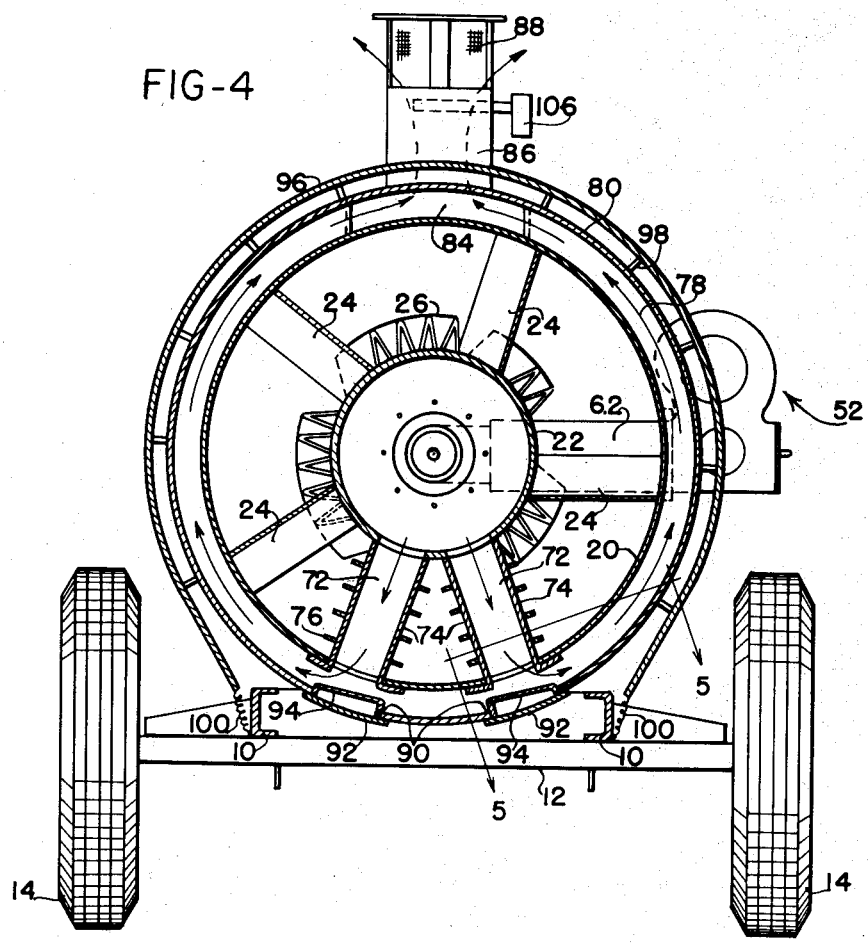
Figure 4 is a transverse section, indicated by line 4—4 on Figure 1.

Cartridge 22 is advantageously supported within shell 20 by means of a plurality of guide vanes 24 spaced about the annular space between the cartridge and shell, as indicated in Figures 2, 3, and 4. These guide vanes are skewed from end to end, and thus eliminate much of the swirling motion of the air passing through the drier that is imparted thereto by the fan, and, in addition, add to the heat exchange surface of the drier.

Additionally, the outer surface of cartridge 22 may include the radially projecting fins 26 which, in a well-known manner, provide for an efficient exchange of heat between the cartridge and the air passing through the shell 20.

Figure 6:
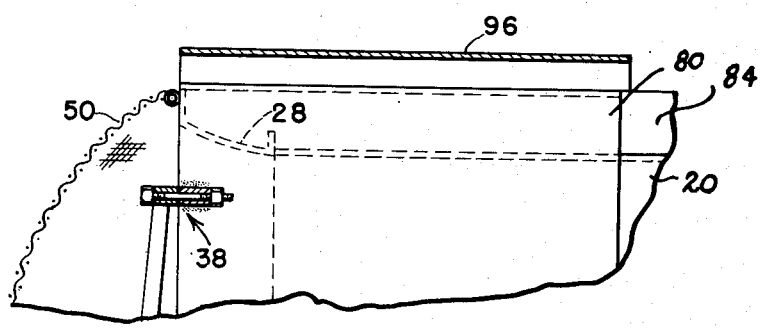
Figure 6 is a fragmentary sectional view indicated by line 6—6 on Figure 1.

At the left end of shell 20, as viewed in Figures 1 and 6, it is abutted by an orifice ring 28, and within which, in the usual manner, there is disposed a propeller or fan 30 carried on the end of a shaft 32. Shaft 32 is journaled in the spaced bearings 34, that are provided by the spider-like frame 36, having the outer ends of its legs bolted to elements fixed about the periphery of orifice ring 28, as indicated at 38 in Figure 6.

Shaft 32 is adapted for being driven by the belt or chain means 40 connecting pulley 42 on shaft 32 with pulley 44 on the output shaft of an electric motor 46 mounted on a platform 48 provided at the end of the supporting frame of the drier. An internal combustion engine could be employed to drive the fan, if more convenient. Also fan may be mounted direct to an electric motor or internal combustion engine if advantageous.

A suitable screen shield 50 may be provided which houses the fan 30 and thus prevents the introduction of foreign matter into the air stream and also prevents injury to anyone near the machine.

As will be seen in Figures 1 through 4, the air stream through the outer shell 20 is from the fan end thereof toward the other end, and heat is supplied to cartridge 22 to the end thereof opposite the fan by means of a burner unit, generally indicated at 52. This burner unit is of a substantially conventional nature and may burn on a liquid or gaseous fuel, whichever is more convenient, and may be regulated according to substantially conventional practices.

In the burner illustrated there are means 54 externally of shell 20 which supply fuel under pressure to a nozzle 56 positioned as shown in Figure 3, and a supply of combustion air to the channel 58 surrounding the nozzle, so that a flame having the proper proportions of fuel and combustion air is projected through the opening 60 into the interior cartridge 22.

Burner unit 54 is preferably connected with a length of conduit 62 that is, in turn, connected with the generally L-shaped conduit 64 that has its one end extending into the end of the cartridge. For supporting the end of the L-shaped conduit 64, the end of the cartridge has a mounting plate 66, having clearance around the periphery of conduit 64, and a second plate 68 is mounted on plate 66. Between these plates is disposed packing, such as asbestos rope packing 70, by means of which the conduit 64 is effectively sealed on the end of cartridge 22, but in such a manner as to allow for expansion and contraction of the conduit and shell and also so as to provide for adequate manufacturing tolerance.

The flame emanating from opening 60 passes through cartridge 22 and exits therefrom through the two exhaust passages 72 provided in the lower side of cartridge 22 at the end thereof adjacent propeller 30.

Figure 5:
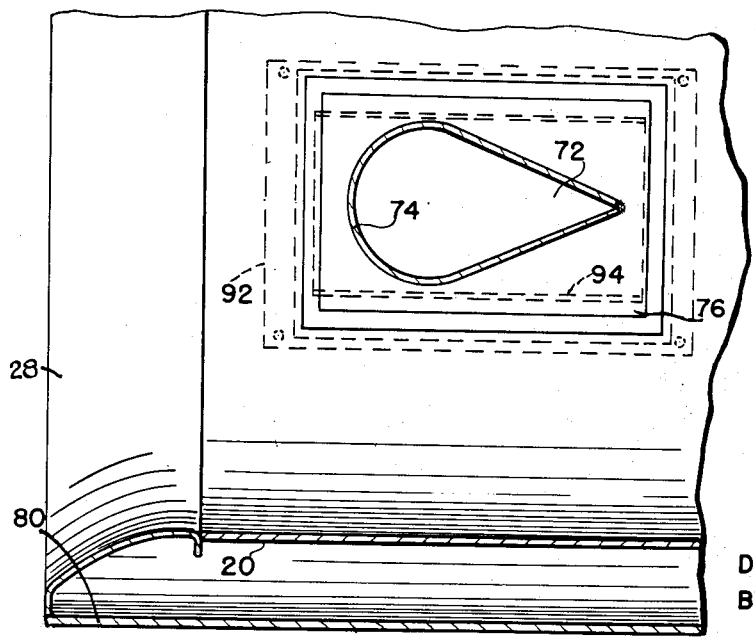
Figure 5 is a section indicated by line 5—5 on Figure 4.

These two exhaust passages are formed of central pipes 74, shaped as illustrated in Figures 3 and 5, so as to provide for efficient air movement thereover and including the heat exchange fins 76 which may advantageously be rectangular in shape. At their lower ends, pipes 74 open to the exterior of shell 20, as is best illustrated in Figure 4.

The combustion gases that are thus delivered from the lower ends of pipes 74 are conveyed around outer shell 20, as represented by the arrows 78 by an annular passage about the outer shell 20 formed by means of the annular member 80 that extends from the rear edge of the orifice ring 28 forwardly about the outer shell 20 to a point where it is joined to the said outer shell by means of angles 82, as will best be seen in Figure 3.

The chamber thus formed communicates at the uppermost point thereof with a passage 84 extending longitudinally along the top of shell 20 to a stack 86 from which the combustion gases issue through a screened opening 88.

In order to provide a ready means for cleaning the annular chamber through which the combustion gases pass between the ends of pipes 74 and passage 84, the annular member 80 is apertured at 90 in alignment with each of the pipes 74 and detachably mounted in each of apertures 90 is a clean-out plate 92 that is preferably formed on its inner surface with a baffle means 94 that tends to deflect combustion gases from the adjacent of the pipes 74 into the said annular chamber in a direction away from the other of the said pipes.

This arrangement at one time provides for efficient movement of the combustion gases, and, at the same time, substantially all residue accumulating within the exhaust passage will be in a position where it can readily be cleaned out merely by removing the clean-out plates. Baffles 94 do not completely close off the annular chamber at the bottom, thus preventing a hot spot on the wall of the chamber, while at the same time the plates 92 are isolated from the hot gases from the stacks and do not tend to burn out.

According to the present invention, the member 80 which forms the annular chamber that conveys the combustion gases from the lower ends of pipes 74 to the passage 84 leading to the stack 86 is shrouded by the annular sheet 96 of substantially the same axial extent as member 80, and being supported thereon by the axial spacing ribs 98 and retained in position, as by springs 100 secured between the ends of sheet 96 and the frame of the drier, as indicated in Figure 4.

The action of the shrouding strip 96 is shown in Figure 3. When blower 30 operates, a flow of air between strip 96 and member 80 is brought about by the suction induced about the periphery of the orifice ring 28, and this flow of air serves to cool the outer surface of the chamber formed by member 80, thereby leading to greater efficiency of operation of the drier and also prevents any part of the outer surface of the drier from being at such a high temperature that it might cause the attendant to become burned or to start a fire.

While the burner unit itself may comprise a built-in thermostatic control which operates to cut off the burner, should the fuel supply thereto become interrupted, in connection with the present device, further more or less conventional means can be provided as an additional safety precaution. A high temperature limit control 104 is provided which extends into the interior of the outer shell 20. A control 106 may be provided in the stack, and which is operable whenever the exhaust gases reach an undesired high limit to interrupt operation of the burner unit, thereby preventing combustion gases of such a temperature as might start a fire from issuing from the stack.

The control system of this invention in one of its several modified forms is illustrated in Figure 8. In this figure there is connected between the power lines L1 and L2 a relay 108, adapted for being energized by the closing of a switch 110 and whose holding circuit extends through the serially arranged high temperature limit control 104 and the stack control thermostat 106.

The stack control thermostat includes a normally closed switch having associated therewith a heat expansible element 112, which will open the switch when the temperature of the gases in the stack exceeds a predetermined amount.

Similarly, limit control 104 includes a normally closed switch blade, and associated therewith is a heat expansible element 114 which will urge the switch blade open when a predetermined high temperature is attained within the shell 20.

Relay 108, when closed, energizes a fuel control solenoid 116, a blower 118, which supplies combustion air to the burner nozzle, and a starter 120. When the flame is established in the nozzle of the burner units, a switch 122 is operable to de-energize the starter 120.

The main blower motor 46 is adapted for being energized by closure of a relay 124, adapted for being energized by the closing of a switch 126 and for being de-energized by opening of a switch 128. To provide an interlock between the main blower motor and the operation of the burner unit, relay 124 may include a blade 130 in series with relay 108, so that the blower motor must be operating before the burner unit can operate. In this manner excessively high temperatures within the heater cartridge 22 are avoided.

A burner control unit 132 is conveniently arranged beneath burner unit 52, and by means of which the temperature of the air discharge can be controlled.

It will be understood that this invention is susceptible to modification in order to adapt it to different usages and conditions, and, accordingly, it is desired to comprehend such modifications within this invention as may fall within the scope of the appended claims.

I claim:

1. In a combustion type air heater, an outer shell at both ends, a fan at one end of the shell for blowing air therethrough, a hollow heater cartridge mounted on the axis of said shell between the ends thereof and having burner means at the end opposite the fan for generating heat within the cartridge, exhaust conduits extending downwardly from the fan end of said cartridge to the outer periphery of said shell, an orifice ring on the said one end of said shell around the fan, a chamber for exhaust gases surrounding said shell at the fan end and communicating with said exhaust conduits for receiving exhaust gases from said exhaust conduits and one end of said chamber being formed by said orifice ring, and exhaust stack means opening from said chamber to the atmosphere.

2. In a combustion type air heater, an outer shell open at both ends, a fan at one end of the shell for blowing air therethrough, a hollow heater cartridge mounted on the axis of said shell between the ends thereof and having burner means at the end opposite the fan for generating heat within the cartridge, exhaust conduits extending downwardly from the fan end of said cartridge to the outer periphery of said shell, an orifice ring on the said one end of said shell around the fan, a chamber for exhaust gases surrounding said shell at the fan end and communicating with said exhaust conduits for receiving exhaust gases from said exhaust conduits and one end of said chamber being formed by said orifice ring, and an exhaust stack opening to the atmosphere from a point on said shell between said chamber and the end of the shell opposite the fan end thereof, and a duct connecting said stack with said chamber and extending along the top of said shell.

3. In a combustion type air heater; an outer shell, a fan at one end of the shell for blowing air therethrough, a hollow heater cartridge on the axis of the shell between the ends thereof having a burner in the end remote from said fan, a pair of exhaust conduits extending downwardly from said cartridge and opening to the outside of said outer shell adjacent the said fan, an annular chamber formed about the shell adjacent the fan and communicating with said exhaust conduits to receive the exhaust gases from said cartridge, the end of said chamber immediately adjacent said fan surrounding the fan and tapering inwardly to form an orifice ring for the fan, and an annular open ended shroud extending about said chamber in radially spaced relation and terminating at the outer end at said orifice ring whereby the operation of said fan will draw air through the space between said shroud and the outer wall of said chamber.

4. In a combustion type air heater; an outer shell, a fan at one end of the shell for blowing air therethrough, a hollow heater cartridge on the axis of the shell between the ends thereof having a burner in the end remote from said fan, a pair of exhaust conduits extending downwardly from said cartridge and opening to the outside of said outer shell adjacent the said fan, an annular chamber formed about the shell adjacent the fan and communicating with said exhaust conduits to receive the exhaust gases from said cartridge, the end of said chamber immediately adjacent said fan surrounding the fan and tapering inwardly to form an orifice ring for the fan, and an annular open ended shroud extending about said chamber in radially spaced relation and terminating at the outer end at said orifice ring whereby the operation of said fan will draw air through the space between said shroud and the outer wall of said chamber, said shroud being of substantially the same axial extent as said chamber.

5. In a combustion type air heater; a cylindrical outer shell open at both ends and having an orifice ring mounted on one end thereof, a spider at the said one end of said shell providing axially spaced bearings on the axis of said shell, a propeller-type fan mounted in said orifice ring and a supporting shaft therefor mounted in said bearings, a hollow heater cartridge locked on the axis of said shell between the ends thereof, spiral guide vanes extending generally lengthwise of said cartridge and shell end interconnected with both thereof for supporting said cartridge, a burner arranged in the end of said cartridge opposite the fan end thereof, exhaust conduits opening from inside said cartridge to the outside of said cylindrical shell adjacent the fan end thereof, an annular chamber formed about said shell at the fan end thereof and communicating with said exhaust conduits to receive combustion gases from said exhaust conduits and being closed at the one end by the said orifice ring, a stack opening from the chamber to the atmosphere for exhausting the gases from said chamber to the atmosphere, and an open ended shroud extending about said annular chamber and spaced radially outwardly from the outer surface thereof and terminating at one end in about the same transverse plane as the inlet of said orifice ring whereby operation of said fan will draw air through the space between the shroud and the chamber.

6. In a combustion type air heater; outer and inner shells arranged in spaced relation and the outer shell being open at both ends, a burner discharging into the inner shell at one end, exhaust conduit means communicating the interior of the inner shell with the exterior of the outer shell, an annular chamber formed about the outer shell with the said outer shell forming the inner wall thereof and into which said conduit opens for receiving combustion gases from said exhaust conduit means, the outer wall of said chamber being provided with apertures in alignment with said conduit means, clean-out door means closing said apertures, and baffle means carried by said door means and spaced therefrom on the inside of the door means to deflect the combustion gases from direct contact with said door means.

7. In a combustion type air heater; outer and inner shells arranged in spaced relation and the outer shell being open at both ends, a burner discharging into the inner shell at one end, a pair of exhaust conduits communicating the interior of said inner shell with the outside of the outer shell at the bottom thereof and on opposite sides of a vertical center line, an annular chamber formed about the outer shell with said outer shell forming the inner wall thereof and into which chamber the exhaust conduits open for receiving combustion gases from said exhaust conduits, the outer wall of said chamber being provided with apertures in alignment with the said conduits, clean-out doors closing said apertures, and baffle means carried by said doors arranged to deflect combustion gases from each of said conduits upwardly in opposite directions, said baffle means comprising plates mounted on the inside of said doors in spaced relation thereto.

8. In a combustion type air heater; outer and inner shells arranged in spaced relation and the outer shell being open at both ends, a burner discharging into the inner shell at one end, a pair of exhaust conduits communicating the interior of said inner shell with the outside of the outer shell at the bottom thereof and on opposite sides of a vertical center line, an annular chamber formed about the outer shell with the outer shell forming the inner wall thereof and into which chamber the exhaust conduits open for receiving combustion gases from said exhaust conduits, the outer wall of said chamber being provided with apertures in alignment with the said conduits, clean-out doors closing said apertures, and baffle means carried by said doors arranged to deflect combustion gases from each of said conduits upwardly in opposite directions, said baffle means comprising a hollow element mounted on the inside of each said door having a surface aligned with the end of the respective of said conduits, each said surface being inclined at an angle to the axis of the respective conduit and outwardly and away from the other conduit so the gases from the said conduit is deflected in a direction away from the other said conduit.

References Cited in the file of this patent

UNITED STATES PATENTS

| | | |
|---|---|---|
| 822,736 | Grouvelle | June 5, 1906 |
| 1,398,264 | Harter | Nov. 29, 1921 |
| 1,407,411 | Harlow | Feb. 21, 1922 |
| 1,558,848 | Doble | Oct. 27, 1925 |
| 1,831,321 | Pickering | Nov. 10, 1931 |
| 1,862,673 | Foster | June 14, 1932 |
| 2,183,596 | Trinks | Dec. 19, 1939 |

(Other references on following page)

UNITED STATES PATENTS

| | | | |
|---|---|---|---|
| 2,275,302 | Magnuson | Mar. 3, | 1942 |
| 2,355,417 | Breese | Aug. 8, | 1944 |
| 2,362,258 | Findley | Nov. 7, | 1944 |
| 2,396,655 | Heymann | Mar. 19, | 1946 |
| 2,410,547 | McCollum | Nov. 5, | 1946 |
| 2,412,088 | Holthouse | Dec. 3, | 1946 |
| 2,417,315 | McCollum | Mar. 11, | 1947 |
| 2,418,182 | McCollum | Apr. 1, | 1947 |
| 2,451,625 | Marshall | Oct. 19, | 1948 |
| 2,488,548 | MacCracken | Nov. 22, | 1949 |
| 2,543,201 | Rifley | Feb. 27, | 1951 |
| 2,555,576 | Criqui | June 5, | 1951 |
| 2,603,207 | Muhlenkort | July 15, | 1952 |
| 2,603,497 | Bramann | July 15, | 1952 |
| 2,621,849 | Minnis | Dec. 16, | 1952 |
| 2,637,487 | Sawyer | May 5, | 1953 |